July 8, 1958  J. V. M. DIGIROLAMO  2,842,638
THERMALLY CONTROLLED ELECTRIC SWITCHES
Filed Feb. 1, 1955
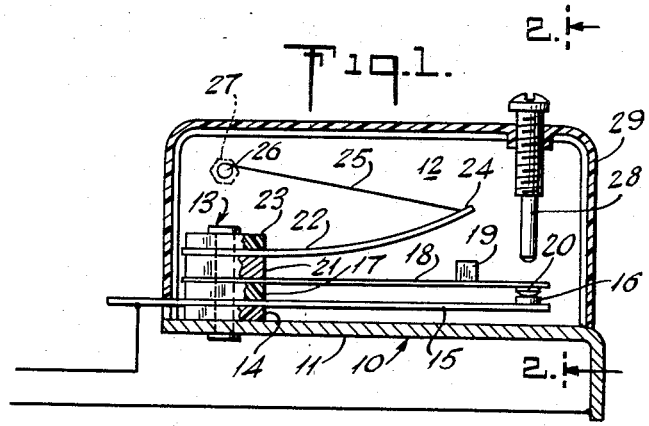
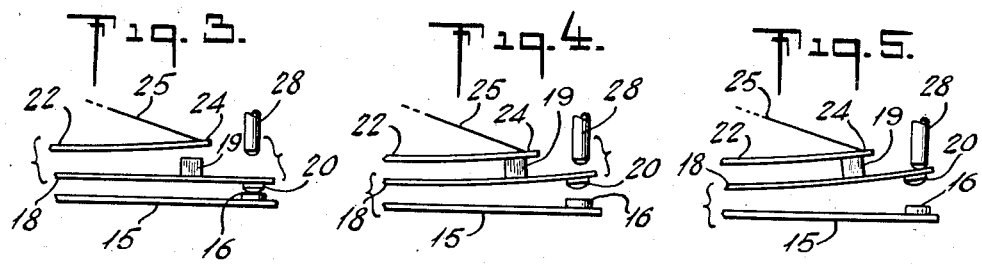
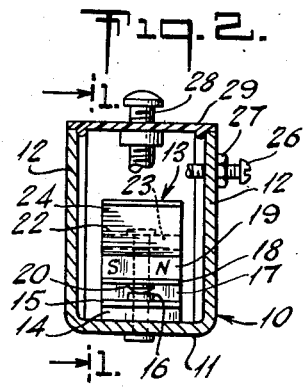
INVENTOR
JOHN V. M. DIGIROLAMO
BY
ATTORNEY United States Patent Office 2,842,638
Patented July 8, 1958

2,842,638

THERMALLY CONTROLLED ELECTRIC SWITCHES

John V. M. Digirolamo, Orange, N. J., assignor to The Lionel Corporation, New York, N. Y., a corporation of New York Application February 1, 1955, Serial No. 485,469

1 Claim. (Cl. 200—113)

The present invention relates to thermally controlled electric switches and is more particularly directed toward such switches suitable for use with toy railroads to provide flashing signals, or blinkers.

The present invention contemplates a switch for the purpose of automatically interrupting the circuit of a lamp so that it flashes on and off. The switch utilizes a fixed contact, a movable contact, spring biased toward the fixed contact, the spring carrying a magnet to move with the movable contact, a magnetizable spring biased toward the magnet and held away from it by a wire under tension, in series with the fixed and movable contacts, and adapted to be heated by the passage of current to allow the magnetizable spring to approach the magnet and attract the magnet toward it, thereby opening the circuit to permit the wire to cool and shorten, and then bring the magnetizable spring against a stop which arrests movement of the contact carrying spring whereupon the magnetizable spring is pulled away from the magnet and the movable contact restored to circuit closing position.

The accompanying drawings show, for purposes of illustrating the present invention, one embodiment in which the invention may take form, it being understood that the drawings are illustrative of the invention rather than limiting the same.

In the accompanying drawings:

Figure 1 is a longitudinal sectional view through the switch, taken on the line 1—1 of Figure 2, the switch being closed and the current carrying wire cool;

Figure 2 is a transverse sectional view on the line 2—2 of Figure 1; and

Figures 3, 4 and 5 are fragmentary views showing successive positions of the parts during a cycle of operations.

As shown in the drawings the support is in the form of a U-shaped sheet metal stamping 10 with bottom 11 and sides 12, 12. Secured to the bottom of the support by a non-conducting rivet 13 is a stack, which includes a lower insulating washer 14, a stiff sheet metal strap 15 carrying a fixed contact 16, an insulating washer 17, a non-magnetizable leaf spring 18 carrying a magnet 19 andn a movable contact 20 biased toward the fixed contact, a conducting washer 21, a magnetizable leaf spring 22, and an insulating washer 23.

The free end 24 of the magnetizable spring 22 is secured to one end of a thermally extendable wire 25, whose other end is wound about and secured to a screw 26 threaded through one of the sides 12 of the support 10. The tension of this wire is adjustable by turning the screw in the support, and a lock nut 27 secures the screw in adjusted position. When the parts are at room temperature the spring 22 is held under tension so that the end 24 is spaced from the magnet and the spring 18 maintains the circuit closed. This circuit includes the fixed and movable contacts 16, 20, the spring 18, the conducting washer 21, the non-metallic spring 22, the wire 25 and screw 26 and the frame or support 10.

When the switch is placed in series with a suitable load, such as a lamp, the current flowing through wire 25, which has a suitable resistance value, heats the wire and the wire stretches so that the end 24 of spring 22 moves toward the magnet 19. As the magnet is preferably placed crosswise of the strap 18 and the magnetizable strip is wide enough to cover both poles of the magnet, there is available, in a small apparatus, attractive force effective to snap the movable contact away from the fixed contact.

The approach of the magnetizable spring toward the magnet is fragmentarily illustrated in Figure 3 and the separation of the contacts is illustrated in Figure 4. When the contacts are separated as in Figure 4, the end of the strap 18 is brought close to adjacent screw 28 carried in cover 29. As the circuit is now opened the wire 25 starts to cool off and shorten. As the magnetized spring and magnet are in contact the shortening of the wire will lift the spring 18 upwardly as indicated in Figure 5 to bring this spring against the lower end of stop 28. Further cooling of the wire 25 pulls the spring 22 away from the magnet and spring 18 shifts the movable contact 20 back against fixed contact 16, thereby reclosing the circuit and starting another cycle of operations.

Since it is obvious that the invention may be embodied in other forms and constructions within the scope of the claim, I wish it to be understood that the particular form shown is but one of these forms, and, various modifications and changes being possible, I do not otherwise limit myself in any way with respect thereto.

What is claimed is:

A thermally controlled current responsive electric switch having a casing, a conductive strap having a fixed end and a free end, a first contact mounted on the upper side of the free end of said strap, a non-magnetizable leaf spring having a fixed end and a free end, a second contact on the under side of said free end of said non-magnetizable leaf spring, a permanent magnet mounted on the upper side of the free end of said non-magnetizable leaf spring, said first and said second contacts being normally engaged whereby the circuit is closed, a magnetizable leaf spring having a free end and a fixed end, a thermally extensible wire having one end connected to the free end of said magnetizable spring so as to be in series with said first and said second contacts, said wire when heated by current flow being adapted to stretch and allow the magnetizable spring to enter the field of said magnet whereby the magnetizable leaf spring and the magnet mutually attract each other so that engagement between said first and second contacts will be broken and the circuit will be opened, the improvement comprising adjustable stop means to control the length of time that said first contact and said second contact are disengaged said adjustable stop means for said non-magnetizable leaf spring including a screw threadedly received in said casing the lower extremity of which is vertically adjustable with respect to the free end of said non-magnetizable leaf spring, said screw being located so that said non-magnetizable leaf spring engages said lower extremity of the screw when said contacts are disengaged.

References Cited in the file of this patent
UNITED STATES PATENTS

| | | |
|---|---|---|
| 499,425 | Haskins | June 13, 1893 |
| 700,812 | Peyton | May 27, 1902 |
| 1,288,947 | McIver | Dec. 24, 1918 |
| 1,651,408 | Peacock | Dec. 6, 1927 |
| 2,312,974 | Owens | Mar. 2, 1943 |
| 2,467,018 | Eggleston | Apr. 12, 1949 |
| 2,545,662 | Huck et al. | Mar. 20, 1951 |
| 2,659,787 | Prickett | Nov. 17, 1953 |
| 2,749,404 | Flubacker | June 5, 1956 |